(12) United States Patent
Gadari et al.

(10) Patent No.: US 9,771,526 B2
(45) Date of Patent: Sep. 26, 2017

(54) MULTI RISER RESID CATALYTIC CRACKING PROCESS AND APPARATUS

(75) Inventors: Saidulu Gadari, Faridabad (IN); Manoj Kumar Bhuyan, Faridabad (IN); Hari Venkata Devi Prasad Terapalli, Faridabad (IN); Debasis Bhattacharyya, Faridabad (IN); Santanam Rajagopal, Faridabad (IN)

(73) Assignee: INDIAN OIL CORPORATION LTD., Kolkata (IN)

( * ) Notice: Subject to any disclaimer, the term of this patent is extended or adjusted under 35 U.S.C. 154(b) by 446 days.

(21) Appl. No.: 13/808,852

(22) PCT Filed: Jul. 4, 2011

(86) PCT No.: PCT/IN2011/000443
§ 371 (c)(1),
(2), (4) Date: Mar. 21, 2013

(87) PCT Pub. No.: WO2012/004807
PCT Pub. Date: Jan. 12, 2012

(65) Prior Publication Data
US 2013/0168289 A1    Jul. 4, 2013

(30) Foreign Application Priority Data

Jul. 8, 2010  (IN) .............................. 748/KOL/2010

(51) Int. Cl.
*C10G 51/02*    (2006.01)
*B01J 8/26*    (2006.01)
(Continued)

(52) U.S. Cl.
CPC .............. *C10G 51/02* (2013.01); *B01J 8/0055* (2013.01); *B01J 8/1863* (2013.01); *B01J 8/26* (2013.01);
(Continued)

(58) Field of Classification Search
CPC ........ C10G 11/14; C10G 25/06; C10G 25/09; C10G 25/12; C10G 51/02; C10G 51/04; B01J 8/18; B01J 8/26; B01J 8/32
See application file for complete search history.

(56) References Cited

U.S. PATENT DOCUMENTS 3,803,024 A    4/1974  Haunschild
5,196,172 A    3/1993  Weinberg et al.
(Continued)

FOREIGN PATENT DOCUMENTS

WO    01/60951 A1    8/2001

OTHER PUBLICATIONS

International Search Report for PCT/IN2011/000443, dated Oct. 25, 2011.

*Primary Examiner* — Brian McCaig
(74) *Attorney, Agent, or Firm* — Maschoff Brennan (57) ABSTRACT

This invention provides a fluidized catalytic cracking apparatus and process for converting a hydrocarbon feedstock containing higher concentrations of Conradson Carbon Residue (CCR), metal impurities, etc into lighter products by employing two riser reactors in which the feed impurities are removed using an adsorbent in a first riser reactor and cracking a portion of first riser reactor liquid product in a second riser reactor to lighter products using the active catalyst thus eliminating the catalyst deactivation due to metal, impurities and FCC catalyst activity dilution effect to achieve a better conversion and higher catalyst longevity.

23 Claims, 3 Drawing Sheets

(51) Int. Cl.

| | |
|---|---|
| *C10G 11/18* | (2006.01) |
| *C10G 25/09* | (2006.01) |
| *C10G 25/12* | (2006.01) |
| *B01J 8/32* | (2006.01) |
| *B01J 8/18* | (2006.01) |
| *B01J 8/00* | (2006.01) |
| *C10G 55/06* | (2006.01) |
| *C10G 55/08* | (2006.01) |
| *C10G 70/04* | (2006.01) |
| C10G 51/04 | (2006.01) |

(52) U.S. Cl.
CPC .................. *B01J 8/32* (2013.01); *C10G 11/18* (2013.01); *C10G 11/182* (2013.01); *C10G 25/09* (2013.01); *C10G 25/12* (2013.01); *C10G 51/026* (2013.01); *C10G 55/06* (2013.01); *C10G 55/08* (2013.01); *C10G 70/041* (2013.01); *B01J 2208/0084* (2013.01); *C10G 2300/205* (2013.01); *C10G 2300/206* (2013.01); *C10G 2300/305* (2013.01); *C10G 2300/4081* (2013.01); *C10G 2300/4093* (2013.01); *C10G 2300/708* (2013.01); *C10G 2300/807* (2013.01); *C10G 2400/02* (2013.01); *C10G 2400/20* (2013.01)

(56) References Cited

U.S. PATENT DOCUMENTS

| | | |
|---|---|---|
| 6,149,875 A | 11/2000 | Rao et al. |
| 7,029,571 B1 | 4/2006 | Bhattacharyya et al. |
| 2002/0003103 A1 | 1/2002 | Henry et al. |
| 2006/0096890 A1 | 5/2006 | Pankaj et al. |
| 2008/0156696 A1 | 7/2008 | Niccum et al. |

MULTI RISER RESID CATALYTIC CRACKING PROCESS AND APPARATUS

FIELD OF THE INVENTION

The present invention relates to a fluidized catalytic cracking (FCC) apparatus for resid upgradation. More particularly, the present invention further relates to a resid catalytic cracking process using adsorbent and catalyst regenerators, a common stripper cum separator vessel for continuous conversion of residual oil containing high concentration of Conradson Carbon Residue (CCR), poisonous metals such as vanadium, nickel, sodium, basic nitrogen and sulphur compounds impurities into lighter products using an adsorbent in a first riser reactor and catalyst in a second riser reactor for cracking of a portion of first riser reactor liquid product to lighter products thus eliminating the catalyst deactivation due to metal, impurities and FCC catalyst activity dilution effect to achieve a better conversion and higher catalyst longevity.

BACKGROUND OF THE INVENTION AND PRIOR ART

The present invention relates to Fluid Catalytic Cracking (FCC). It discloses both a process and an apparatus for an improved FCC. Due to the increasing cost of crude oil, refineries are under ever increasing pressure to economise their operations and to look for novel and innovative approaches to achieve savings. In the prior art, FCC was done with feedstocks that had a comparatively lower boiling temperature because feedstock having high boiling temperatures are considered unsafe. Also, the catalysts faced much higher degree of de-activation as the feedstock boiling temperature went up. The present invention addresses this problem and offers a process and apparatus which makes it possible to use feedstock with higher boiling temperatures. This big advantage and affords considerable savings in FCC. It presents a multiriser resid catalytic cracking apparatus with catalysts and adsorbent regenerators and a process to achieve the same.

Cracking is fundamentally a high temperature treatment which breaks up heavier or large hydrocarbon molecules into small ones, often at the same time altering their internal construction. Fluid Catalytic Cracking (FCC) is one of the most important processes employed in petroleum refineries for catalytic cracking of hydrocarbons, particularly petroleum fractions such as gas oils, to lower molecular weight gasoline and fuel oil products. This process is practiced industrially in a cyclic mode wherein hydrocarbon feedstock is contacted with hot, active solid particulate catalyst without added hydrogen at rather low pressures of up to about 100 psig and at temperatures sufficient to support the desired cracking.

Typical FCC feedstocks are distillates of vacuum tower having a boiling range from 300° C. to 550° C. The feedstocks boiling in excess of about 550° C., typically vacuum and atmospheric bottoms containing higher amount of Conradson Carbon Residue (CCR) are undesirable as FCC feedstocks due to presence of more organic metal compounds, such as nickel, vanadium porphyrins along with sodium and basic nitrogen compounds. However, refiners are showing interest for processing of heavy residues in the FCC Units for enhanced conversion and to improve refinery margin. These metals cause many undesirable reactions during cracking of heavy oils, specifically nickel and vanadium, are quite harmful to the FCC catalysts. These metals deposit on the catalyst and accumulate with time. Metals such as Ni and V are poisons in the FCC process, reducing gasoline yields and increasing production of undesirable dry gas such as hydrogen, methane and coke yields, decreasing the selectivity of the catalyst in making liquid products.

The high CCR of the feed tends to form coke on the catalyst surface, which in turn brings down the catalyst activity and its selectivity. Moreover, the higher deposit of coke on the catalyst increases the regenerator temperature and therefore catalyst/oil ratio reduces to maintain the heat balance of FCC unit. The FCC catalyst can tolerate a maximum temperature of up to 750° C., which limits the CCR of feed that can be processed in a FCC unit. At present, FCC unit with two stage regenerators with catalyst coolers can handle feed CCR up to 8 wt % economically.

These problems are understood and recognized in the prior art and various methods, such as delayed coking, residue hydro demetallation and desulfurization processes have been proposed to upgrade the feedstock containing more CCR and metals. However, these processes are used for feedstock preparation and require other secondary processes for producing lighter products. In the past, there have been some efforts to passivate the damaging effects of nickel and vanadium on the catalyst. These efforts have resulted only with some success in the passivation of nickel. Thus, by the known methods, it is presently possible to handle up to 30 PPM of nickel on the feed and up to 10,000 PPM nickel on the equilibrium catalyst. Similarly, with the known processes, vanadium up to only 30 PPM on feed and 15000 PPM on the equilibrium catalyst can be handled economically. These above limits pose serious problem of residue processing capability of FCC units. As such, huge quantity of metal laden equilibrium catalyst is withdrawn from resid FCC/RFCC units to keep the circulating catalyst metal level within the tolerable limit. Passivation changes the heat balance of the unit and product yield pattern, re-stabilize the unit at another steady state. The changed heat balance also calls for a change in operating conditions such as lower regenerator temperature, increased catalyst circulation, etc. As regards the passivation of basic nitrogen compounds, suitable passivation technology is yet to be found.

In addition to the developments of passivation technologies, there have been some important design changes made in FCC for efficient residue processing. One such design change is the two-stage regeneration in place of single stage regeneration. The advantage of two-stage regenerator is flexibility to handle additional feed CCR without requiring catalyst cooler. However, even with two-stage regenerator without catalyst cooler, there is limitation to increase feed CCR above 4-5 wt % and vanadium above 15-20 PPM on feed.

U.S. Pat. No. 5,324,417 relates to fluid catalytic cracking and cleanup of waste streams such as slop oils, spent caustic, spent DEA, spent activated carbon, spent resins, refinery sludges and the like. This patent describes a method for simultaneous conversion of contaminated streams such as refinery slop, sludge oils, etc. and vacuum gas oils in an auxiliary reactor and conventional FCC unit respectively. Auxiliary reactor is a bubbling fluidized bed reactor, which is isolated from the main FCC reactor. Part of FCC E-cat, removed from the main FCC reactor is used in an auxiliary reactor but share a product fractionator and its downstream with the main FCC reactor. Regeneration of the spent catalyst of main FCC reactor and auxiliary reactor are carried out separately. The process is capital cost intensive as it uses two independent FCC units.

U.S. Pat. No. 5,919,352 and PCT Application No. 99/03951 explains a method for conversion of residue to lighter products in two stage process wherein the first stage is an upgrading stage by means of thermal cracking in a horizontal moving bed of fluidized hot particles wherein the CCR content and metals content of residual feedstock is lowered and the second stage is a catalytic cracking stage containing a reactor, regenerator for conversion of upgraded residue to lighter products.

U.S. Pat. No. 5,059,302 discloses an improvement in the fluid catalytic cracking (FCC) of hydrocarbon feedstocks, especially those containing one or more impurities, such as metals, basic nitrogen compounds and asphaltenes (Conradson carbon), in which a particulate fluidizable material that is a sorbent is used to remove one or more of such impurities from the feedstock before the feedstock contacts particles of cracking catalyst for conversion of the feedstock into lighter products, such as gasoline. The separation of the sorbent and catalyst particles is carried out in the regenerator.

It has been suggested in the art to use active adsorbent to capture the metals from the feed before the feed is contacted with the active catalyst in the same riser. It has also been suggested in the art to use a separable mixture of catalyst and demetallizing additive particles. For example, in U.S. Pat. Nos. 4,895,637, 5,021,222, 5,110,775 and PCT Application No. 00/01484 suggest a physically separable mixture of FCC catalyst and demetallizing additive having sufficient differences in their settling velocities so that the particles are separable in a single stage regenerator. U.S. Pat. No. 5,110,775 also suggests providing a separate vessel, outside the regenerator to improve the regeneration of the additive particle. Though such a process is simple, there are several practical disadvantages, which limit its resid-handling capability, poor segregation efficiency due to sufficient turbulence and mixing in the bed and as vanadium is highly mobile in the regenerator atmosphere and the vanadium may escape from the demetallizing additive to the catalyst particle at these conditions. This defeats the basic purpose of eliminating catalyst deactivation due to metal poisoning.

U.S. Pat. No. 5,286,691 also describes a process for converting a residual hydrocarbons into lighter products using separable metal getter and cracking catalyst particles. Single regenerator is used for regeneration of both type of particles and demetallation is carried out using a demetallation solution in a separate in vessel provided outside of the regenerator.

U.S. Pat. Nos. 4,875,994, 5,059,302 and 5,196,172 explain the use of two-stage regenerator and physically separable particles for conversion of residual oils having large amounts of metals and CCR. Particle separation is carried in the first regenerator based on the size variation of the particles. However, this process also does not eliminate catalyst deactivation due to metal poisoning as additive and catalyst are exposed to combustion conditions in regenerator-1, wherein separation of these two particles is taking place.

Another approach to process residual oils in single riser reactor is explained in U.S. Pat. Nos. 6,149,875, 6,656,344, 7008595 and 7381322. It suggests using physically separable mixture of catalyst and adsorbent for having sufficient differences in their minimum fluidization velocities and or settling velocities depending upon the nature of catalyst. The mixture of adsorbent and catalyst can be separated either in stripper using difference in their minimum fluidization velocities or in a separate vessel using difference in their settling velocities. Deactivation of the catalyst particles due to metals poisoning is eliminated, as these solid particles are separated in non-combustion environment. The disadvantage of these processes is catalyst activity dilution due to presence of adsorbent particles while cracking of the cleaner feedstock at elevated portion of the riser.

Therefore, there is a need to upgrade residual oils containing higher CCR and metal concentrations to lighter products through a more efficient and cost effective method. There is also a need to develop a process to upgrade residue feed stocks while extending cracking cycle life of the catalyst and the improved yield of lighter compounds.

The present invention is aimed at avoiding or overcoming the difficulties or limitations encountered in the prior art to provide an improved resid cracking process and an apparatus for converting residual oil containing high concentrations of Conradson Carbon Residue (CCR), poisonous metals such as vanadium, nickel and sodium; basic nitrogen and sulphur compounds impurities into substantially impurity free lighter products by employing an adsorbent to remove one or more impurities from the feedstock before the feedstock comes in contact with the cracking catalyst whereby the cracking cycle life of the catalyst is extended and the yield of lighter products is improved.

Another advantage of the invention is to provide an improved process and apparatus comprising multiple riser reactors wherein the feedstock impurities are removed by contacting the feed with an adsorbent in a first reactor while main cracking of impurity free feedstock is done in another reactor to obtain high value products such as propylene, LPG, gasoline etc. thus eliminating the catalyst deactivation due to metal impurities and FCC catalyst dilution effect to achieve a better conversion and higher catalyst longevity.

Still another advantage of the invention is to provide a resid cracking apparatus with stripper cum separator that handles the differences in the particle size and density of adsorbent and catalyst particulates for separation.

Another advantage of the invention is to provide a resid cracking apparatus which uses a concept of vertical separator plate inside the stripper cum separator vessel to restrict mixing of the adsorbent and the catalyst used therein eliminating the requirement of physical differences between the adsorbent and the catalyst for the separation.

Still another advantage of the invention is to provide separate regenerators for regenerations of adsorbent having deposits of feed impurities and spent cracking catalyst.

Yet, another advantage of the invention is to provide a compatible design for said apparatus so that it can be used also with other FCC designs.

Still another advantage of the invention is to enhance the life of the apparatus by controlling the operating temperatures optionally by using catalyst coolers.

SUMMARY OF THE INVENTION

Accordingly, the present invention provides a fluidized catalytic cracking apparatus and process for converting a hydrocarbon feedstock containing higher concentrations of Conradson Carbon Residue (CCR), metal impurities, etc into lighter products by employing two riser reactors in which the feed impurities are removed using an adsorbent in a first riser reactor and cracking a portion of first riser reactor liquid product in a second riser reactor to lighter products using the active catalyst thus eliminating the catalyst deactivation due to metal, impurities and FCC catalyst activity dilution effect to achieve a better conversion and higher catalyst longevity.

The present invention also discloses a resid catalytic cracking process using adsorbent and catalyst regenerators, a common stripper cum separator vessel for continuous conversion of residual oil containing high concentration of Conradson Carbon Residue (CCR), poisonous metals such as vanadium, nickel, sodium, basic nitrogen and sulphur compounds impurities into lighter products.

DETAILED DESCRIPTION OF THE INVENTION

According to this invention there is provided a continuous fluidized catalytic cracking (FCC) process for converting a hydrocarbon feedstock containing higher concentrations of impurities such as Conradson Carbon Residue (CCR), metallic and other impurities such as herein described, into lighter hydrocarbon products by employing multiple elongated riser reactors, a common stripper cum separator, common fractionator and multiple regenerators for regenerating adsorbent and catalyst used therein concurrently comprising the following steps:

a) Contacting the feedstock with hot adsorbent supplied from the adsorbent regenerator in the first riser reactor, the adsorbent being lifted to the feedstock injection zone using lifting medium, where the feedstock gets vaporized, purified and undergoes mild cracking to obtain substantially impurities free hydrocarbons vaporous products comprising mainly heavy cycle oil and materials higher boiling than said heavy cycle oil with minor amount of naphtha fraction, lighter gaseous hydrocarbon material fraction, light cycle oil and impurities laden adsorbent particles and separating said impure adsorbent particles from the hydrocarbons using riser termination device with cyclone separators inside the stripper cum separator device, while simultaneously, b) Cracking severely at least a portion of liquid product comprising cracked heavy cycle oil and material higher boiling than heavy cycle oil or mixtures obtained from the common fractionator in a second riser reactor in presence of regenerated cracking catalyst supplied from the catalyst regenerator to obtain vaporous conversion products comprising gasoline boiling range material having a high aromatic content and octane number and lighter gaseous hydrocarbon material, light cycle oil material and separating the catalyst particles from the said vaporous conversion products in the cyclone separator provided therefor inside the stripper cum separator device used in step (a), c) Combining the vaporous conversion products from the second and first riser reactors in a common disengaging zone therein, separating entrained adsorbent and catalyst particles from vaporous products in respective riser termination devices and passing the combined conversion products to a common fractionator containing a fractional distillation zone to recover at least a gasoline boiling range material fraction, higher gaseous hydrocarbon material fraction, a light cycle oil boiling range material fraction, a heavy cycle oil boiling range material fraction and including slurry oil, d) Separating the spent adsorbent and spent catalyst in the stripper cum separator vessel, e) Withdrawing the separated spent adsorbent and spent catalyst from the common stripper cum separator vessel and transferring the same to respective regenerators for regenerating the spent catalyst and spent adsorbent, f) Regenerating the spent adsorbent and the spent catalyst in the respective regenerators separately by combustion of impurities therein by an oxygen containing gas at elevated temperature, and g) Transferring the regenerated adsorbent from the adsorbent regenerator to the first riser reactor and transferring the regenerated catalyst from the catalyst regenerator to the second riser reactor for maintaining the continuous cracking cycle.

In one embodiment of the invention, the separation of the spent adsorbent and the spent catalyst of step (d) is carried out by maintaining proper superficial velocity of fluidization media like steam leading to segregation of the spent adsorbent and the spent catalyst in two different layers depending upon the particle size, density and differences in their minimum fluidization velocity, by using the fluidization media, so that heavier particles of coked adsorbent are settled at the bottom of the stripper cum separator and the lighter particles of spent catalyst are settled at the upper location of the stripper cum separator while all the strippable interstitial hydrocarbons are stripped off from the spent cracking catalyst and spent adsorbent mixture in the said stripper cum separator, the segregated layers of spent catalyst and spent adsorbent are separately transported to respective regenerators via respective stand pipes and control valves.

The particle size of adsorbent and catalyst are kept different for improving separation efficiency for their layer separation in the stripper cum separator vessel.

In another embodiment of the invented process, the separation of spent adsorbent and the spent catalyst is carried out by providing a vertical separator plate inside the stripper cum separator vessel by which the spent adsorbent and spent catalyst are collected independently and separately without any possibility of mixing of the two in the said stripper cum separator vessel.

In another embodiment, cracked naphtha and light cycle oil are used along with heavy cycle oil and main column bottom as feedstock to the second riser reactor in order to maximize the production of light olefins such as propylene, ethylene etc.

The residence time of hydrocarbons is kept in the first riser below 2 sec and vapor residence time in the second riser reactor is maintained below 5 sec depending on the severity of the operation.

The adsorbent cooler used is similar to conventional catalyst cooler for maintaining the heat balance in the adsorbent regenerator especially while processing residual oils containing CCR above 5 wt % and upto 20 wt %.

Conradson Coke, metal and other impurities laden adsorbent withdrawn from the regenerator contains metals as high as 35000 ppm.

In still another embodiment the catalyst comprises particles of REY/USY-zeolite, shape selective pentasil zeolite and a CO promoter.

The ratio of total steam flow to hydrocarbon flow in the riser reactors ranges from 01:10 to 1:2 wt/wt.

The first riser reactor has a ratio of adsorbent to total hydrocarbon in a range of 3:1 to 10:1 wt/wt and the second riser reactor has a ratio of catalyst to total hydrocarbon in a range of 5:1 to 25:1 wt/wt.

The lighter hydrocarbon products mean and include ethylene, propylene, C4 olefins and high-octane gasoline.

In another embodiment, the present invention provides for an apparatus for continuous fluidized catalytic cracking for converting a hydro-carbon feedstock containing higher concentrations of Conradson Carbon Residue (CCR), metal and other impurities such as herein described into lighter hydrocarbons comprising the following main units:

(i) An elongated first riser reactor having at its base a first inlet for introducing regenerated adsorbent from an adsorbent regenerator, a second inlet for introducing heavy hydrocarbon feedstock with high CCR and other impurities as aforesaid and a third inlet for introducing high velocity steam therein and an outlet at the top via a riser termination device with cyclone separators placed at the top inside a stripper cum separator for separating out spent adsorbent and taking out purified and some cracked hydrocarbon vapors and steam mixture therefrom to a fractionator, (ii) An elongated second riser reactor having at its base a first inlet for introducing regenerated FCC catalyst from a catalyst regenerator, a second inlet for introducing substantially impurity free heavy feedstock receivable from the fractionator as aforesaid and a third inlet for introducing high velocity steam therein and an outlet at the top via riser termination device with cyclone separators placed at the top inside the said stripper cum separator for separating out the spent catalyst and the cracked lighter hydrocarbon vapours and steam, (iii) A common stripper cum separator having injection means at different locations along its height from the base for introducing steam in the upward direction and connected to the first riser reactor termination device of said unit (i) through cyclone separators with dip legs projected downwards inside it and to the second riser reactor termination device of said unit (ii) through another set of cyclone separators with legs dip downward inside it, a zone for collecting the spent adsorbent and the spent catalyst for their separation with respective outlets therefor through respective stand pipes and valve means and for transporting the same to the adsorbent regenerator and the catalyst regenerator respectively, (iv) A fractionator for carrying out fractionation cum separation of different cracked hydrocarbons received from the stripper cum separator of said unit (iii) with means for collecting separated different boiling hydrocarbon products including the heavy oil bottom being linked to the second riser reactor of said unit (ii) for using as a feedstock for the continuous cracking process, (v) An adsorbent regenerator for reactivating the spent adsorbent having an inlet at its bottom for introducing air or oxygen containing gas, a second inlet in mid portion therein in flow communication with an outlet for the spent adsorbent from the said stripper cum separator through a standpipe and valve means for introducing the spent adsorbent therein, an outlet at its bottom for recovering and transporting the regenerated or reactivated adsorbent through a stand pipe and valve means to the first riser reactor of said unit (i), and another outlet at its top for the disposal of the flue gas; the adsorbent regenerator additionally has cyclone separators within it at the top for separating the flue gas in entrained adsorbent, (vi) A catalyst regenerator for regenerating the catalyst having an inlet at its base for introducing air or oxygen containing gas, an inlet in mid portion along its height for introducing the spent catalyst therein from the said stripper cum separator of unit (iii) through a standpipe and valve means, an outlet at its base for recovering and transporting the regenerated catalyst via a standpipe and valve means to the said second riser reactor of unit (ii), and another outlet at its top for the disposal of flue gas; the catalyst regenerator additionally has cyclone separators within it at the top for separating the flue gas from the entrained catalyst.

The zone for collecting spent adsorbent and spent catalyst is situated at the bottom of the stripper cum separator wherein the spent adsorbent and the spent catalyst are segregated as separate layers, the adsorbent being heavier is collected at the bottom and transported therefrom to the adsorbent regenerator through the bottom outlet and the catalyst being lighter is collected in the higher layer from which it is transported to the catalyst regenerator through the outlet therefor at a higher level in the said stripper cum separator.

In another embodiment of the invented apparatus there is provided a vertical separator plate inside the stripper cum separator vessel, which ensures independent collection of the spent catalyst and the spent adsorbent at the bottom of the stripper cum separator without any mix-up of the materials, the outlets therefor being provided at the bottom for transporting the spent catalyst and spent adsorbent to the respective regenerators.

DESCRIPTION OF THE INVENTION WITH REFERENCE TO ACCOMPANYING DRAWINGS

Figure 1:
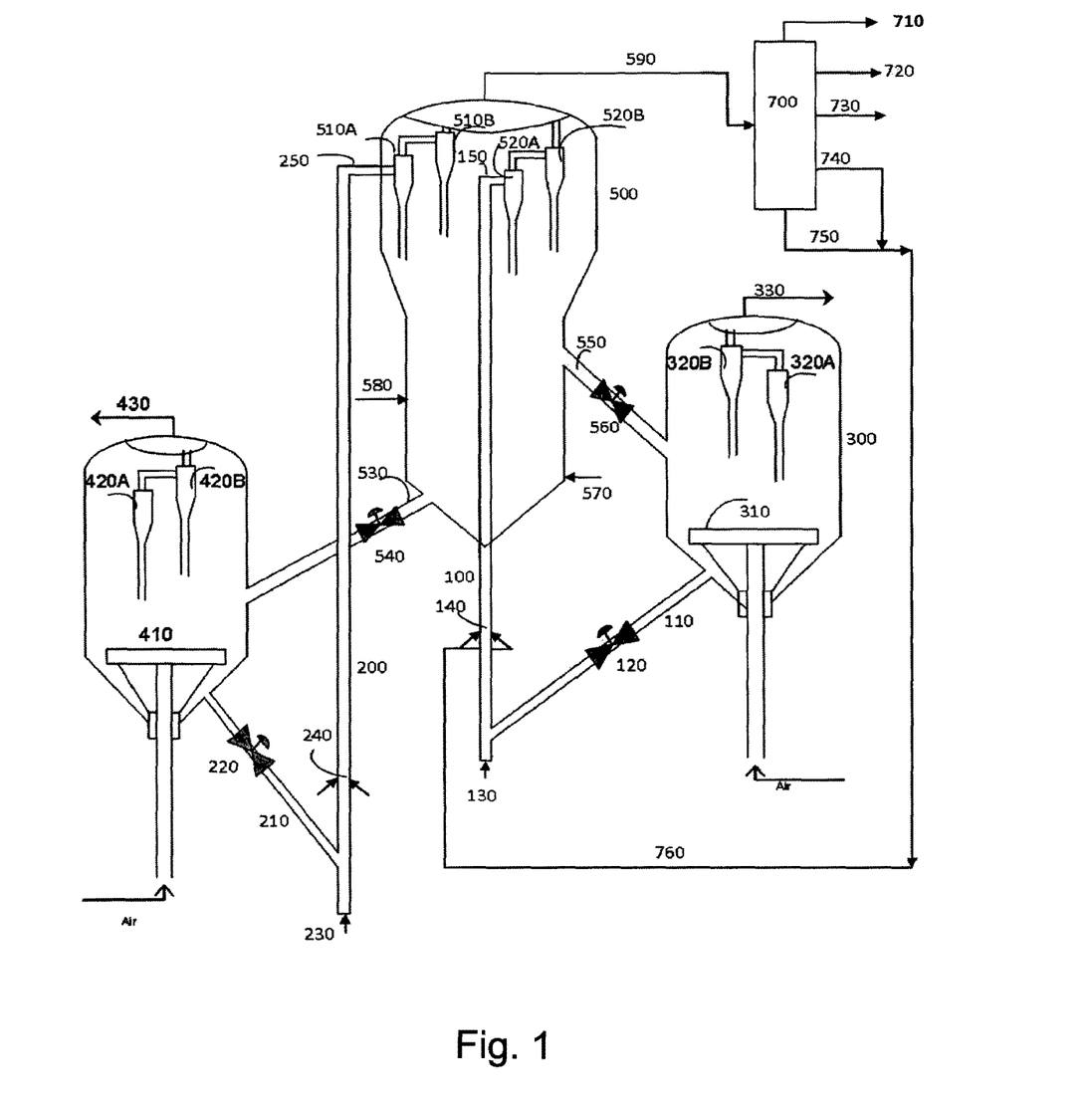
FIG. 1 represents one embodiment of a resid fluidized catalytic cracking unit of the invention for continuous conversions of residual oil containing high CCR, metals, sodium, basic nitrogen and sulphur compounds impurities into substantially impurity free lighter hydrocarbon products and regenerating and recycling the adsorbent and the catalyst used therein.

FIG. 1 is a diagrammatic illustration with the major vessels shown in cross-section comprising of a first riser reactor (200) for adsorption of feed impurities and second riser reactor (100) for cracking of at least a portion of liquid product of the first riser reactor effluent. A common stripper cum separator vessel (500) is used for stripping of hydrocarbons from the spent adsorbent as well as spent catalyst and separating the spent adsorbent from the spent cracking catalyst. Regeneration of the spent adsorbent and spent catalyst is carried out separately in adsorbent regenerator (400) and catalyst regenerator (300) respectively.

The purpose of using adsorbent particles is to adsorb the CCR, the poisonous metals e.g. vanadium, nickel, sodium, iron and basic nitrogen and sulfur compounds existing in the residual hydrocarbon fractions. As shown in FIG. 1, the hot and low activity adsorbent is added to the bottom of the first riser reactor 200 through standpipe 210 and flow control valve 220. Steam introduced through nozzle 230 is used as lift medium to fluidize the adsorbent and carry it upward to the feed injection point 240. Fuel gas, ethane, propane, and nitrogen gases, light naphtha can also be used as lift medium to fluidize the adsorbent. A heavy residual feedstock is injected at the lower portion 240 of the first riser reactor via feed nozzles. 10-50 weight percent steam is added to the residual feed to assist in vaporization of the feed. The feed can be a mixture of different heavy hydrocarbon feed stocks such as vacuum tower bottom, atmospheric tower bottom, heavy vacuum gas oils, etc. containing higher concentration of metals, CCR, basic nitrogen, etc. Maximum benefit is obtained particularly if the metal level and CCR level of the feed are above 25 ppm and 5 wt % on feed respectively.

The resid feed contacts hot regenerated adsorbent at feed injection point 240, which may have relatively low activity than conventional FCC catalyst. Typically, adsorbent particles are having particle size in the range of 200-500 microns but preferably within 300-400 microns. The particles density may be within 1500-3000 kg/m$^3$ and preferably 1800-2600 kg/m$^3$ and most preferably 2300-2500 kg/m$^3$. The adsorbent particles mainly consist of the microspheres composed of alumina, silica alumina, silica magnesia, kaolin clay or a mixture thereof having acidic properties or could be totally non acidic. Typically, these materials have very less acidic cracking activity characterized by Mat activity of less than 25 and surface area of less than 40 m$^2$/gm.

When hydrocarbon feedstock contacts with hot regenerated adsorbent, instantaneous vaporization of feedstock takes place and volumetric flow rate increases, which facilitate to transport the solid adsorbent particles in the upward direction. Thermal cracking of the feedstock also takes place along the first riser reactor length. Outlet temperature of the first riser reactor (ROT) is maintained at 500-600° C. by controlling the regenerated adsorbent flow to the first riser reactor 200 from the adsorbent regenerator 400 via stand pipe 210 and control valve 220. The adsorbent/oil ratio is varied in the range of 3-10. The superficial velocity is maintained in the range of 5-20 m/s typically, which will be sufficient to lift the impurities laden adsorbent particles through the riser. The vapor residence time in the first riser reactor may be maintained between 1-5 seconds and preferably between 2-3 seconds depending on the concentration levels of impurities in the feed.

Heavy organo-metallics, basic nitrogen compounds and precursors to coke are selectively deposited on the adsorbent during vaporization and thermal cracking of the hydrocarbons. The combined mixture then passes upward to the first riser reactor terminus 250 followed by cyclone separators 510A and 510B. The separated spent adsorbent is collected in the stripper cum separator vessel 500 and vapor product is routed to the fractionation section 700 via overhead line 590. Cracked products are separated into various product fractions, from heavy material such as main column bottom withdrawn via line 750 to gaseous products withdrawn via line 710. Intermediate fractions include a heavy cycle oil fraction withdrawn via line 740, light cycle oil withdrawn via line 730 and naphtha fraction withdrawn via line 720. The stripper cum separator vessel 500 also receives mixture of FCC spent catalyst and hydrocarbon vapor from the second riser reactor 100, wherein, the spent catalyst is separated from the vapor by cyclone separators 520A and 520B.

The hot and active regenerated catalyst is added to the second riser reactor 100 via standpipe 110 and control valve 120 from the catalyst regenerator vessel 300. Steam is introduced through nozzle 130 to act as lift medium to fluidize the catalyst and to transport the catalyst particles in upward direction to the feed injection point 140. Conventional state of the art commercial catalyst used in FCC technology may be employed in this invention. The preferred catalysts contain large pore zeolites such as Y-zeolites, medium pore zeolites such as ZSM-5 and ZSM-11. The particle size of the catalyst remains within 20-200 microns and more preferably 20-170 microns and most preferably 20-100 microns.

Feedstock is introduced to feed injection point 140 through injection nozzles. The feedstock to the second riser reactor is basically a portion of liquid product collected from the fractionation section 700, most preferably a mixture of main column bottom withdrawn via line 750 and heavy cycle oil withdrawn via line 740. In one preferred embodiment of the invention, the naphtha portion withdrawn via line 720 and light cycle oil withdrawn via line 730 are also used along with the heavy cycle oil and main column bottom as feedstock to the second riser reactor, wherein the production of light olefins such as propylene, ethylene, etc are to be maximized.

When hydrocarbon feedstock contacts with hot regenerated catalyst, instantaneous vaporization of feedstock takes place with increase in volumetric flow rate, which facilitate to transport the solid catalyst particles in the upward direction. Selective catalytic cracking of the feedstock takes place along the second riser reactor length. Outlet temperature of the second riser reactor (ROT) is maintained at 500-650° C. by controlling the regenerated catalyst flow to the second riser reactor 100 from the catalyst regenerator 300 via stand pipe 110 and control valve 120. The catalyst/oil ratio is varied in the range of 5-25. The superficial velocity is maintained in the range of 5-20 m/s typically, which will be sufficient to lift catalyst particles through the riser. The vapor residence time in the riser may be maintained between 1-10 seconds and preferably between 2-5 seconds depending on the desired conversion level.

Cracked hydrocarbon vapor and steam are separated from the catalyst particles in the cyclones 520A and 520B provided inside the stripper cum separator vessel 500. The hydrocarbons are stripped off from the mixture of spent adsorbent and spent FCC catalyst by using counter current injection of steam at the bottom portion of stripper cum separator vessel 500. The separated hydrocarbons along with the hydrocarbon effluent of the first riser reactor are routed to fractionation section 700 via overhead line 590.

Stripping of hydrocarbon vapors and separation of spent adsorbent from the spent catalyst are carried out in the stripper cum separator vessel 500 using steam as a stripping/fluidizing media. The superficial velocity of steam in stripper cum separator vessel 500 is maintained in such a way that the spent adsorbent and the spent catalyst are segregated in different layers due to the difference in their physical properties. Stripping steam is injected at the bottom of the stripper cum separator via line 570 and/or at different elevations via line 580 to achieve better stripping efficiency. Usually, 1.0-3.0 tons per 1000 tons of solid flow is the normal rate of total steam flow in the stripper. In the present invention, the superficial velocity of stripping gas is maintained in the range of 0.1-0.3 m/s. However, it is preferred to maintain higher velocity of the stripping gas typically above 0.15 m/s, which is close to the minimum fluidization velocity of denser particles for ensuring better segregation and stripping. Spent catalyst being lighter in comparison to the spent adsorbent, is segregated at the top portion and enters into stand pipe 550 and finally to catalyst regenerator 300 via control valve 560 for regeneration. Spent adsorbent is segregated at the bottom portion and enters into stand pipe 530 and finally to adsorbent regenerator 400 via control valve 540 for regeneration.

The spent adsorbent containing coke, metals and other impurities is regenerated in the adsorbent regenerator 400 by an oxygen containing gas, such as air, oxygen enriched air that is distributed via an air grid 410. The flue gas from this adsorbent regenerator 400 is separated from the entrained adsorbent by cyclone/series of cyclones 420A and 420B and discharged through outlet 430. The adsorbent regenerator usually runs on the partial combustion mode under controlled air flow in dense bed fluidization regime. The coke burnt from the adsorbent is sufficient to maintain the adsorbent regenerator temperature upto 750° C. and preferably between 680-750° C. The excess oxygen in the flue gas could be in the range 0-1 vol % and $CO/CO_2$ may vary in the range 0.2-10 vol/vol. There is no maximum limit of coke on the adsorbent. Usually, it is observed that at higher concentration of coke on the adsorbent, the vanadium and CCR trapping ability of the adsorbent improves. In case of heavy CCR residue above 10 wt %, catalyst cooler is required for maintaining the regenerator temperature below 700° C.

The spent catalyst is regenerated in the catalyst regenerator 300 by an oxygen containing gas, such as air, oxygen enriched air that is distributed via an air grid 310. The flue gas from the catalyst regenerator 300 is separated from the entrained adsorbent by cyclone/series of cyclones 320A and 320B and discharged through outlet 330. The excess air is maintained in the regenerator such that full combustion is achieved and the coke on regenerated catalyst is less than 0.1 wt % preferably less than 0.05 wt %. Regenerator temperature is maintained in the range 700 to 750° C.

Figure 2A:
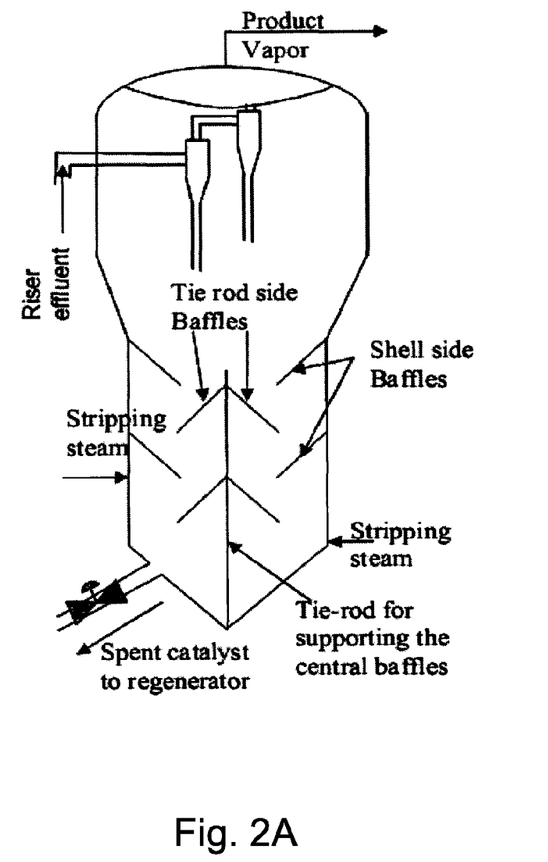
FIG. 2A shows use of baffles inside the stripper vessel of normal FCC units for enhancing the efficiency of hydrocarbon stripping from the spent catalyst, wherein the baffles have concentric holes for vapor/hydrocarbon passage in upward direction.
Figure 2B:
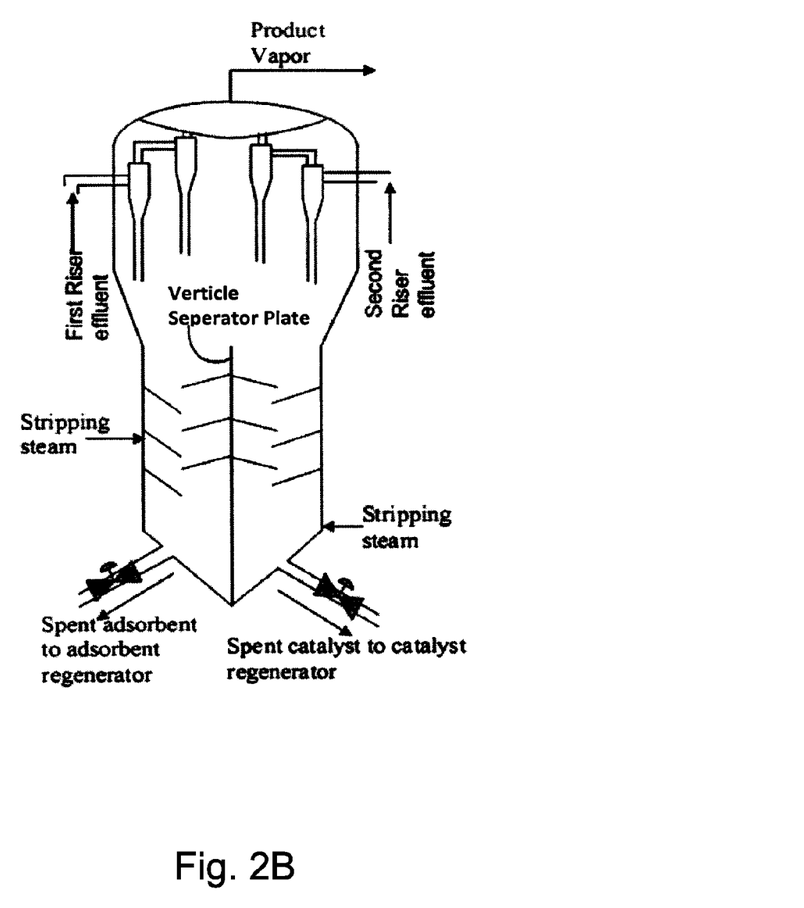
FIG. 2B shows the vertical separator plate of present invention used inside the stripper cum separator vessel for restricting mixing of adsorbent and FCC catalyst inside the vessel.

FIG. 2B gives diagrammatic illustration of another embodiment of the cracking apparatus of the invention. Difference with the embodiment of FIG. 1 is that there is provided a vertical "separator plate" within the stripper cum separator 500 which restricts mix-up of the spent catalyst with the spent adsorbent in the vessel thus eliminating the requirement of physical differences between the spent adsorbent and the spent catalyst. Additionally, the stand pipe 550 for taking out the spent catalyst to the catalyst regenerator 300 is located at the bottom of the stripper cum separator vessel 500 instead of at the middle of the vessel 500 as in FIG. 1. The height of the separator plate is such that the spent adsorbent and the spent catalyst are directly and independently collected at the bottom of the stripper cum separator vessel 500 without any possibility of their mix-up.

The major achievements obtained in the present invention are summarized below:

1. The present invention converts residue hydrocarbons containing higher concentration of CCR, metals, basic nitrogen, sodium to low boiling point products such as LPG, high octane gasoline and diesel range products using two stages of feed contacting, first by an adsorbent followed by an active catalyst in separate riser reactors.

2. The adsorbent contacts first with the residue hydrocarbons in the first riser reactor, where mild cracking of the feed takes place along with capturing of most of the metals, CCR and other poisons present in the residue.

3. As removal of feedstock contaminant and cracking of the contaminant free feedstock are carried out separately in a separate flow reactors, the activity of dilution of the catalyst is eliminated thereby leading to a higher conversion and higher catalyst longevity.

4. A portion of liquid product obtained through fractionation of cracked vapor from the first riser reactor is cracked in the second riser reactor through contact with the high active catalyst to produce a very high yield of light olefins and distillate products.

5. Though Adsorbent and catalyst particles are handled in a common stripping vessel, their regeneration is carried out separately and thereby deactivation of the catalyst particles due to metal poisoning is eliminated. This greatly improves the overall performance of the catalyst and also brings down catalyst make up rate.

6. Differences in physical properties like particle size and density are maintained between adsorbent and catalyst for better separation efficiency inside the stripper.

7. Use of a vertical separator plate inside the stripper cum separator further augments the separation efficiency of the adsorbent and the catalyst by eliminating the requirement of difference of their particle sizes and densities.

8. The metal laden adsorbent can be withdrawn from the adsorbent regenerator containing metals as high as 35000 ppm, from which high value vanadium and nickel can be extracted.

We claim:

1. An apparatus for continuous fluidized catalytic cracking for converting a hydro-carbon feedstock containing higher concentrations of Conradson Carbon Residue (CCR), metal and other impurities into lighter hydrocarbons comprising the following units:
   (i) a first riser reactor having at its base a first inlet for introducing regenerated adsorbent from an adsorbent regenerator, a second inlet for introducing heavy hydrocarbon feedstock with high CCR and other impurities as aforesaid and a third inlet for introducing high velocity steam therein and an outlet at the top via a riser termination device with cyclone separators placed at the top inside a stripper cum separator for separating out spent adsorbent and taking out purified and some cracked hydrocarbon vapors and steam mixture therefrom to a fractionator,
   (ii) a second riser reactor having at its base a first inlet for introducing regenerated FCC catalyst from a catalyst regenerator, a second inlet for introducing substantially impurity free cracked heavy feedstock receivable from the fractionator as aforesaid and a third inlet for introducing high velocity steam therein and an outlet at the top via riser termination device with cyclone separators placed at the top inside said stripper cum separator for separating out the spent catalyst and the cracked lighter hydrocarbon vapors and steam,
   (iii) said stripper cum separator, having injectors at different locations along its height from the base for introducing steam in the upward direction and connected to the first riser reactor termination device of said unit (i) through cyclone separators with dip legs projected downwards inside it and to the second riser reactor termination device of said unit (ii) through another set of cyclone separators with legs dip downward inside it, a zone for collecting the spent adsorbent and the spent catalyst for their separation with respective outlets therefore through respective stand pipes and valves and for transporting the same to the adsorbent regenerator and the catalyst regenerator respectively,
   (iv) a fractionator for carrying out fractionation cum separation of different cracked hydrocarbons received from the stripper cum separator of said unit (iii) with means for collecting separated different boiling hydrocarbon products including the heavy oil bottom being linked to the second riser reactor of said unit (ii) for using as a feedstock for the continuous cracking process,
   (v) an adsorbent regenerator for reactivating the spent adsorbent having an inlet at its bottom for introducing air or oxygen containing gas, an inlet in mid portion therein in flow communication with the outlet for the spent adsorbent from the said stripper cum separator through a standpipe and valve means for introducing the spent adsorbent therein, an outlet at its bottom for recovering and transporting the regenerated or reactivated adsorbent through a stand pipe and valve means to the first riser reactor of said unit (i), and another outlet at its top for the disposal of the flue gas; the adsorbent regenerator additionally has cyclone separators within it at the top for separating the flue gas in entrained adsorbent, and (vi) a catalyst regenerator for regenerating the catalyst having an inlet at its base for introducing air or oxygen containing gas, an inlet in mid portion along its height for introducing the spent catalyst therein from the said stripper cum separator of unit (iii) through a standpipe and valve means, an outlet at its base for recovering and transporting the regenerated catalyst via a standpipe and valve means to the said second riser reactor of unit (ii), and another outlet at its top for the disposal of flue gas; the catalyst regenerator additionally has cyclone separators within it at the top for separating the flue gas from the entrained catalyst.

2. An apparatus as claimed in claim 1, wherein the zone for collecting spent adsorbent and spent catalyst is situated at the bottom of the stripper cum separator wherein the spent adsorbent and the spent catalyst are obtained as separate layers, the adsorbent being heavier is collected at the bottom and transported therefrom to the adsorbent regenerator through the bottom outlet and the catalyst being lighter is collected in the higher layer from which it is transported to the catalyst regenerator through the outlet therefor at a higher level in the said stripper cum separator.

3. An apparatus as claimed in claim 1, wherein a vertical separator plate is provided inside the said stripper cum separator, which ensures independent collection of the spent catalyst and the spent adsorbent at the bottom of the stripper without any mix-up of the materials, thus eliminating the requirement of difference in particle sizes and densities of spent catalyst and spent adsorbent for efficient separation, the outlets therefor being provided at the bottom for transporting the spent catalyst and spent adsorbent to the respective regenerators.

4. A continuous fluidized catalytic cracking (FCC) process for converting a hydrocarbon feedstock containing higher concentrations of impurities such as Conradson Carbon Residue (CCR), metallic and other impurities such as herein described, into lighter hydrocarbon products by employing multiple riser reactors, a common stripper cum separator, common fractionator and multiple regenerators for regenerating adsorbent and catalyst used therein concurrently comprising the following steps:

(a) contacting the feedstock with hot adsorbent supplied from an adsorbent regenerator in the first riser reactor, the adsorbent being lifted to the feedstock injection zone using lifting medium, where the feedstock gets vaporized, purified and undergoes mild cracking to obtain substantially impurities free hydrocarbons vaporous products comprising a naphtha fraction, lighter gaseous hydrocarbon material fraction, light cycle oil, heavy cycle oil and materials higher boiling than said heavy cycle oil, and impurities laden adsorbent particles and separating said impure adsorbent particles from the hydrocarbons using riser termination device with cyclone separators inside the stripper cum separator device, while simultaneously, (b) cracking severely at least a portion of liquid product comprising cracked heavy cycle oil and material higher boiling than heavy cycle oil or mixtures obtained from the common fractionator in a second riser reactor in presence of regenerated cracking catalyst supplied from a catalyst regenerator to obtain vaporous conversion products comprising gasoline boiling range material having a high aromatic content and octane number and lighter gaseous hydrocarbon material, light cycle oil material and separating catalyst particles from the said vaporous conversion products in the cyclone separator provided therefore inside the stripper cum separator device used in step (a), (c) combining the vaporous conversion products from the second and first riser reactors in a common disengaging zone therein separating entrained adsorbent and catalyst particles from vaporous products in respective riser termination devices and passing the combined conversion products to a common fractionator containing a fractional distillation zone to recover at least a gasoline boiling range material fraction, higher gaseous hydrocarbon material fraction, a light cycle oil boiling range material fraction, a heavy cycle oil boiling range material fraction and including slurry oil, (d) separating spent adsorbent and spent catalyst in the stripper cum separator vessel, (e) withdrawing the separated spent adsorbent and spent catalyst from the common stripper cum separator vessel and transferring the same to respective regenerators for regenerating the spent catalyst and spent adsorbent, (f) regenerating the spent adsorbent and the spent catalyst in the respective regenerators separately by combustion of impurities therein by an oxygen containing gas at elevated temperature, and (g) transferring the regenerated adsorbent from the adsorbent regenerator to the first riser reactor and transferring the regenerated catalyst from the catalyst regenerator to the second riser reactor for maintaining the continuous cracking cycle.

5. A process as claimed in claim 4, wherein the separation of the spent adsorbent and spent catalyst of step (d) is carried out by maintaining proper superficial velocity of fluidization media leading to segregation of the spent adsorbent and the spent catalyst in two different layers depending upon the particle size, density and differences in their minimum fluidization velocity, by using the fluidization media, so that heavier particles of coked adsorbent are settled at the bottom of the stripper cum separator and the lighter particles of spent catalyst are settled at the upper location of the stripper cum separator while all the strippable interstitial hydrocarbons are stripped off from the spent catalyst and spent adsorbent mixture in the said stripper cum separator, the segregated layers of spent catalyst and spent adsorbent are separately transported to respective regenerators via respective stand pipes and control valves.

6. A process as claimed in claim 4, wherein separate riser reactors with circulating adsorbent and catalyst system are used thus eliminating the catalyst deactivation due to metal, impurities and FCC catalyst activity dilution effect to achieve a better conversion and higher catalyst longevity.

7. A process as claimed in claim 4, wherein the particle size of adsorbent and catalyst are kept different for improving separation efficiency for their layer separation in the stripper cum separator vessel.

8. A process as claimed in claim 4, wherein the separation of spent adsorbent and the spent catalyst is carried out by providing a vertical separator plate inside the stripper cum separator vessel by which the spent adsorbent and spent catalyst are collected independently and separately without any possibility of mixing of the two in the said stripper cum separator.

9. A process as claimed in claim 4, wherein cracked naphtha and light cycle oil are used along with heavy cycle oil and main column bottom as feedstock to the second riser reactor in order to maximize the production of light olefins.

10. A process as claimed in claim 4, wherein the adsorbent is selected from the group consisting of magnesia, silica magnesia, kaolin clay, alumina silica alumina and a mixture thereof having acidic and non-acidic properties.

11. A process as claimed in claim 4, wherein the adsorbent has a particle size ranging from 200-500 micrometers with particle density ranging from 1500 to 3000 Kg/m$^3$ while the particle size of the catalyst is kept ranging from 20 to 200 micrometers with particle density ranging from 1200 to 1800 kg/m$^3$.

12. A process as claimed in claim 4, wherein the residence time of hydrocarbons in the first riser is 1-5 seconds and vapor residence time in the second riser reactor is maintained between 1-10 seconds depending on the severity of the operation.

13. A process as claimed in claim 4, wherein the superficial velocity of steam in the stripper cum separator vessel is maintained in the range of 0.1-0.3 m/s for efficient stripping.

14. A process as claimed in claim 4, wherein the adsorbent regenerator is maintained at a temperature ranging from 680 to 750° C.

15. A process as claimed in claim 4, wherein adsorbent cooler which is similar to conventional catalyst cooler be used for maintaining the heat balance in the adsorbent regenerator while processing residual oils containing CCR above 5 wt% and upto 20 wt%.

16. A process as claimed in claim 4, wherein air is maintained to achieve total combustion in catalyst regenerator and the coke on regenerated catalyst is less than 0.1 wt%, resulting in control of regenerator temperature within the range of 700-750° C.

17. A process as claimed in claim 4, wherein the hydrocarbon feedstock has a nickel content upto 50 ppm and vanadium content upto 100 ppm.

18. A process as claimed in claim 4, wherein the impurities laden adsorbent contain metals as high as 75000 ppm.

19. A process as claimed in claim 4, wherein the regenerated cracking -catalyst comprises particles of REY/USY-zeolite, shape selective pentasil zeolite and a CO promoter.

20. A process as claimed in claim 4, wherein the first riser reactor is operated at temperature ranging from 500 to 600° C. and the second riser reactor is operated at temperature ranging from 500 to 650° C.

21. A process as claimed in claim 4, wherein the ratio of total steam flow to hydrocarbon flow in the riser reactors ranges from 01:10 to 1:2 wt/wt.

22. A process as claimed in claim 4, wherein the first riser reactor has a ratio of adsorbent to total hydrocarbon in a range of 3:1 to 10:1 wt/wt and the second riser reactor has a ratio of catalyst to total hydrocarbon in a range of 5:1 to 25:1 wt/wt.

23. A process as claimed in claim 4, wherein lighter products include ethylene, propylene, C4 olefins and high-octane gasoline.

* * * * *